United States Patent Office 2,813,060
Patented Nov. 12, 1957

2,813,060

17α OXYGENATION OF STEROIDS BY SPORORMIA

Eugene L. Dulaney, Saskatoon, Saskatchewan, Canada, and William J. McAleer, Roselle, N. J., assignors to Merck & Co., Inc., Rahway, N. J., a corporation of New Jersey No Drawing. Application December 27, 1955, Serial No. 555,280

12 Claims. (Cl. 195—51)

This invention relates to a method of introducing oxygen substituents into a steroid molecule and particularly to a process of preparing 17α-hydroxy steroids by subjecting 17α-desoxy steroids to the action of an oxygenating strain of microorganisms for their oxygenating enzymes.

The discovery of the remarkable therapeutic properties of cortisone, hydrocortisone and similar related compounds has stimulated wide interest in finding simpler and more economical methods of preparing such compounds. In the synthesis of these compounds, it is necessary to introduce a 17α-hydroxy substituent. Although various methods have been developed for the synthesis of 17α-hydroxy steroids, such processes are not entirely satisfactory and other methods more suitable for the commercial preparation of 17α-hydroxy steroids in high yields have been sought.

Methods for effecting the oxygenation of steroids by the action of microorganisms are known in the art. For example, various Actinomycetes are known to introduce oxygen into a number of positions of the steroid molecule. Similarly, various species of genera included in the order Mucorales also introduce oxygen in various positions of the steroid ring structure.

It has been suggested to introduce oxygen substituents at position 17 by the action of various microorganisms but these processes have resulted in low yields of products due to the simultaneous formation of the oxygenated products and/or extensive degradation of the steroid molecule.

A primary object of the present invention is to produce oxygenated steroids by a process not subject to the difficulties encountered in the processes previously available. A related object is to produce 17α-hydroxy steroids by fermentation processes in economically feasible yields without the formation of undesirable side products. Other objects and the advantages of this invention will appear hereinafter.

In accordance with the present invention, it has been found that the oxygenation of steroids is conveniently effected by subjecting steroids to the action of an oxygenating strain of fungi of the genus Sporormia and preferably the species *minima* or to oxygenating enzymes produced by these microorganisms. The practice of this invention is particularly suitable for converting 17-desoxy pregnenes to the corresponding 17α-hydroxy pregnene in good yields without the excessive formation of undesirable side products. The ability of these microorganisms to introduce a hydroxy group at the 17-carbon of the steroid nucleus is considered surprising since genera such as Penicillium and Aspergillus cause oxygenation in other positions of the steroid nucleus. Thus, this this method provides a valuable means for introducing a 17α-hydroxy substituent and thereby preparing hormones such as cortisone and other products suitable as intermediates for the production of compounds related thereto, such as hydrocortisone.

The processes of this invention are particularly valuable since the use of fungi of the genus Sporormia makes possible the introduction of a 17α-hydroxy group by fermentation procedures. Thus, this invention provides an expedient fermentation procedure for the introduction of such a group that was heretofore introduced by involved organic synthesis necessitating a number of steps. Another advantage of this process is that the action of the species Sporormia minima will introduce oxygen selectively at the 17-position. This is important since it results in the obtainment of much better yields of the desired product and makes possible the use of simpler methods for effecting its recovery.

Another advantage of the use of the species Sporormia minima is that the starting material which is not converted to the 17α-hydroxy steroid is not all destroyed by conversion to other polyhydroxylated side products and may therefore be conveniently recovered by extraction and then by recycling the recovered starting material the desired 17α-hydroxy steroid is produced in good yield. This is of particular importance since the prior art methods resulted in the destruction of the expensive starting steroids. Another important characteristic of this process is the ability of the organism to grow on and oxidize sterols in a great variety of culture media. Further, the oxygenating strains of the genus Sporormia are very stable and can be lyophilized and stored without affecting their oxygenating characteristics. In addition, the fermentation with this species can be carried out in mediums containing only minor amounts of antifoam agents thereby further facilitating the recovery of the desired oxygenated products.

The oxygenating strains of the genus Sporormia employed in the process of this invention are of the class Ascomycetes, the order Sphaeriales, and of the family Sphaeriaceae.

The microoragnisms in the genus Sporormia can be obtained from known sources such as the Northern Regional Research Laboratories, Peoria, Illinois, or American Type Culture Collection, Washington, D. C., or Centraalbureau voor Schimmelcultur, Baarn, Holland. Alternately they may be obtained from natural sources using techniques known to microbiologists.

In carrying out the process of this invention the steroid to be oxygenated is subjected to the action of an oxygenating enzyme produced by growing an oxygenating strain of fungi of the genus Sporormia. This is conveniently accomplished by growing the microorganism under aerobic conditions in a suitable nutrient medium in intimate contact with the steroid to be oxygenated; the culturing growth of the microorganism being continued until the desired oxygenation has occurred. Alternately the process is effected by the use of homogenized resting cells by first growing the microorganism in a suitable fermentation medium under aerobic conditions and then separating the cells from the fermentation medium and adding the steroid to these resting cells and continuing the aerobic conditions for sufficient time to effect the desired oxygenation. The use of resting cells has the advantage of simplifying the recovery procedure.

The steroid can be added to the nutrient medium as a suspension in a suitable solvent such as water, as a solution in a solvent such as acetone, propylene glycol, dimethylformamide or dimethylacetamide, or in a finely divided form such as a solid micronized powder. In general, it is desirable that the steroid be present in very finely divided form in order to permit maximum contact with the oxygenating culture medium and insure completion of the reaction. All of the steroid may be added at one time or the addition may be continuous or intermittent over a period of time.

The process of the present invention can be effected in both stationary and submerged cultures of the species Sporormia minima (NRRL 2475) growing under aerobic conditions, although for practical purposes it is most conveniently carried out by growing the microorganism under submerged conditions in a suitable aqueous fermentation medium containing the steroid. The amount of the steroid which can be conveniently oxygenated by our method will depend in part upon the particular medium employed.

Aqueous nutrient mediums suitable for the growing of oxygenating strains of Sporormia must contain sources of assimilable carbon and nitrogen as well as minor amounts of inorganic salts. Any of the usual sources of assimilable carbon such as dextrose, cerelose, glucose, inverted molasses, and the like, employed in fermentation mediums can be used in carrying out the process of our invention. Similarly, complex sources of nitrogen usually employed in commercial fermentation process such as lactalbumin digest ("Edamine") and corn steep liquor, or inorganic sources of nitrogen such as dibasic ammonium phosphate, ammonium nitrate, and the like, are satisfactory for use in the fermentation mediums. Minor amounts of other substances such as nicotinamide or inorganic salts such as suitable soluble salts of magnesium, zinc, potassium, sodium, phosphorous, and iron are usually available in complex sources of carbon and nitrogen or may be conveniently added to the fermentation medium in minor amounts to promote maximum growth of the oxygenating microorganism.

The following are examples of suitable aqueous nutrient mediums which can be used in our process of oxygenating steroids:

Medium No. 1

| | Grams |
| --- | --- |
| Commercial dextrose (cerelose) | 50.00 |
| Commercial lactalbumin digest (Edamine) | 20.00 |
| Corn steep liquor | 5.00 |
| Malt extract | 2.0 |

Distilled water is added to give a total volume of 1 liter of nutrient medium and the pH adjusted to 6.5 with sodium hydroxide.

Medium No. 2

| | Grams |
| --- | --- |
| Inverted black strap molasses | 100.0 |
| Commercial lactalbumin digest (Edamine) | 20.0 |
| Corn steep liquor | 5.0 |

Distilled water is added to give a total volume of 1 liter of nutrient medium and the pH adjusted to 6.5 with sodium hydroxide.

Medium No. 3

| | Grams |
| --- | --- |
| Inverted black strap molasses | 100.0 |
| Corn steep liquor | 20.0 |

Distilled water is added to give a total volume of 1 liter of nutrient medium and the pH adjusted to 6.5 with sodium hydroxide.

Medium No. 4

| | Grams |
| --- | --- |
| Inverted black strap molasses | 100.0 |
| Corn steep liquor | 20.0 |

Distilled water is added to give a total volume of 1 liter of nutrient medium and the pH adjusted to 6.5 with sodium hydroxide.

Medium No. 5

| | Grams |
| --- | --- |
| Inverted black strap molasses | 50.0 |
| Corn steep liquor | 6.3 |

Distilled water is added to give a total volume of 1 liter of nutrient medium and the pH adjusted to 6.5 with sodium hydroxide.

Medium No. 6

| | Grams |
| --- | --- |
| Dextrose | 50.0 |
| $(NH_4)_2HPO_4$ | 7.5 |
| $K_2HPO_4$ | 1.0 |
| $MgSO_4.7H_2O$ | 0.5 |
| KCl | 0.5 |
| $FeSO_4.7H_2O$ | 0.01 |
| $ZnSO_4.7H_2O$ | 0.01 |

Distilled water is added to give a total volume of 1 liter of nutrient medium and the pH adjusted to 6.5 with sodium hydroxide.

Medium No. 7

| | Grams |
| --- | --- |
| Edamine | 20.0 |
| Corn steep | 0.62 |
| Dextrose | 50.0 |

Distilled water is added to give a total volume of 1 liter of nutrient medium and the pH adjusted to 6.5.

The addition of minor amounts of anti-foaming agents, although not essential, is desirable with some fermentation mediums. It has been found that the addition to certain fermentation mediums of a substituted oxazaline which is a nonvolatile, amine-type, cationic surface active agent available under the trade name Alkaterge C is particularly effective in reducing the amount of foam, although other anti-foam agents known to be useful for this purpose can also be used.

As indicated above, the process of this invention is particularly useful in the oxygenation of 17-desoxy pregnenes to obtain the corresponding 17α-hydroxy pregnene. Other steroids, however, may be oxygenated thereby producing suitable intermediates in the preparation of hormones. Thus, this process is applicable in general to saturated and unsaturated cyclopentanopolyhydrophenanthrene compounds. Such cyclopentanopolyhydrophenanthrene compounds may be unsubstituted or may contain substituents such as keto, hydroxyl, acyloxy, halide, alkyl and the like at various positions of the cyclopentanopolyhydrophenanthrene nucleus. In addition, such compounds may have at the 17-position a ketol side chain, a saturated or unsaturated hydrocarbon side chain, a carboxylic acid side chain, and the like. Examples of other classes of such cyclopentanopolyhydrophenanthrene compounds that might be mentioned are pregnanes, allopregnanes, androstanes, bile acids and their esters, sterols, sapogenins and derivatives thereof. Thus representative steroids having a 17-desoxy group such as progesterone; 4-pregnene-21-ol-3,20-dione-21-actate; desoxycorticosterone; 4-pregnene-3,20-dione; 3-keto-cholanic acid; lithochloric acid; 4-pregnene-3-ol-20-one;5,6-dichloropregnane-3-ol-20-one; 5,6-dichloropregnane-21-ol-3,20-dione; and the like, can be oxygenated at position 17 to obtain the corresponding 17α-hydroxy derivatives.

For example, a 17-desoxy pregnene can be oxygenated in accordance with the following procedure. A sterile culture medium, such as those shown above, is first inoculated by introducing a small amount of spore suspension of vegetative growth of an oxygenating strain of the species Sporormia minima (NRRL-2475). The inoculated nutrient medium is then incubated at a temperature of about 20–45° C., while being agitated in the presence of oxygen for a period of about a few hours to several days. At this point, a solution of a 17-desoxy pregnene in a solvent such as propylene glycol is added to the fermentation medium and the agitation and aeration of the nutrient medium continued for about 5 to 30 hours, or until the oxygenation reaction is completed.

When the oxygenation is complete, the oxygenated steroid may be recovered from the fermentation broth by extraction with a suitable water immiscible organic solvent for the oxygenated steroids. Suitable solvents for this purpose that might be mentioned are chloroform, methylene chloride, 2-methyl-5-ethyl pyridine, organic acid esters, aromatic hydrocarbons, ketones and amides, and the like. The solvent solution containing the desired oxygenated steroid can then be evaporated to yield the desired product which may be further purified by recrystallization or other procedures conventional in the art.

Alternatively, the process of this invention can be effected by contacting the oxygenating enzymes produced by the fermentation of the microorganism with the steroid to be oxygenated. This can be accomplished by recovering the oxygenating enzymes from a fermentation broth in accordance with procedures known in the art, and intimately contacting such enzymes with a steroid in an aqueous medium.

The following examples are given for purpose of illustration.

EXAMPLE 1

A culture medium having the composition described as medium #6 was sterilized for 30 minutes at 120° C. in a 250 ml. flask. Duplicate 50 ml. samples of medium were then inoculated with approximately ten ml. each of a vegetative growth of culture *Sporormia minima* (NRRL–2475). The vegetative growth had been developed for four days on medium #1. The mixture was then agitated using a rotary shaker at an agitation speed of 220 R. P. M., while maintaining the temperature at 28° C. for approximately 72 hours. A sterile solution of 20 mg. of 4-pregnene-3,20-dione in 0.5 ml. of dimethylformamide was added to the fermented medium and the agitation continued at the same rate for approximately 48 hours for one flask and 96 hours for the remaining flask. The batch was then filtered and extracted with ethyl acetate. The ethyl acetate extracts were combined and developed for 16 hours on a paper chromatogram using the Zaffaroni technique reported in Science III, 6 (1950) and the solvent system cyclohexane-benzene (50=50) propylene glycol-methanol (50=25). A spot was observed with a $R_f$ corresponding to 4-pregnene-17a-ol-3,20-dione and which gave a vanillin-sulfuric acid test (orange color), and a positive test (blue color) with the iodine potassium iodide reagent which are characteristic of 4-pregnene-17a-ol-3,20-dione.

EXAMPLE 2

A culture medium having the composition described as medium #6 was sterilized for 30 minutes at 120° C. in a 250 ml. flask. Duplicate 50 ml. samples of medium were then inoculated with approximately three ml. each of a vegetative growth of culture *Sporormia minima* (NRRL–2475). The vegetative growth had been developed for seven days on medium #1. The mixture was then agitated using a rotary shaker at an agitation speed of 220 R. P. M., for approximately 48 hours while maintaining the temperature of 28° C. A sterile solution of 20 mg. of 4-pregnene-3,20-dione in 0.5 ml. of dimethylformamide was added to the fermented medium and the agitation continued at the same rate for 48 hours. At the end of this period the batch was filtered and extracted with ethyl acetate and the entire extract spotted and developed as in Example 1. The extract gave significant quantities of the oxidation product opposite 4-pregnene-17a-ol-3,20-dione. The band opposite 4-pregnene-17a-ol-3,20-dione was cut out and eluted with methanol. The methanol eluate was concentrated in vacuo and the residue treated with concentrated sulfuric acid. The ultraviolet spectrum in concentrated sulfuric acid was found to be similar to that of 4-pregnene-17a-ol-3,20-dione.

EXAMPLE 3

A process was carried out in the same manner as Example 2 except that 10 mg. 4-pregnene-21-ol-3,20-dione was added in place of the 4-pregnene-3,20-dione and the inoculum was carried through two passages of 5 days each. The product spotted and developed as in Example 1 gave significant quantities of the oxidation product opposite 4-pregnene-17a,21-diol-3,20-dione.

EXAMPLE 4

A process was carried out in the same manner as Example 2 except that 10 mg. of 4-pregnene-11β,21-diol-3,20-dione was added in place of 4-pregnene-3,20-dione and the inoculum was developed for five days. The product after extraction with ethylacetate and evaporation of the solvent was chromatographed on paper. The product gave positive tests for 4-pregnene-11β,17a,21-diol-3,20-dione.

EXAMPLE 5

A process was carried out in the same manner as Example 4 except that 10 mg. of 4-pregnene-11β-ol-3,20-dione was added in place of 4-pregnene-11β,21-diol-3,20-dione. The product gave positive tests for 4-pregnene-11β,17a-diol-3,20-dione.

EXAMPLE 6

Forty-four samples of approximately 50 ml. each of a culture medium having the composition described as medium #6 were placed in 250 ml. flasks and sterilized for 30 minutes at 120° C. The mediums were then each inoculated with approximately ten ml. of a vegetative growth of culture *Sporormia minima* (NRRL–2475). The mixtures were then agitated using a rotary shaker at an agitation speed of 220 R. P. M. while maintaining the temperature at 28° C. for approximately 48 hours. A sterile solution of 20 mg. of 4-pregnene-21-ol-3,20-dione in 0.5 ml. of dimethylformamide were added to each of the sixty fermented mediums and the agitation continued at the same rate for 54 hours. The fermentation broths were then filtered and pooled. The broth was filtered through a supercel precoated Büchner funnel. The mycelium was extracted twice with 500 ml. ethyl acetate. The ethyl acetate was added to the broth and then separated. The broth was extracted with an additional 500 ml. ethyl acetate. The combined extracts were washed with 500 ml. saturated sodium bicarbonate solution and then twice with 500 ml. water. The ethyl acetate was evaporated off leaving a light brown oil. The oil was partioned between 60% methanol-water and petroleum ether. The methanol water solution was concentrated to a small volume, which was extracted with chloroform. The chloroform extract was concentrated to a brown oil. An aliquot was chromatographed in the benzene-50% methanol system for 16 hours. The paper strip indicated that 4-pregnene-21-ol-3,20-dione was converted to a product with a mobility of 4-pregnene-17a,21-diol-3,20-dione.

This product gave a positive test with blue tetrazolium, iodine-potassium iodide reagent (blue) and a pink color with concentrated sulfuric acid. Mobility in a mixed chromatogram and color tests indicate that the microorganism converts 4 - pregnene - 21 - ol - 3,20 - dione to 4-pregnene-17a,21-diol-3,20-dione.

Any departure from the above description which conforms to the present invention is intended to be included within the scopes of the claims.

What is claimed is:

1. A process for the production of 17α-hydroxy steroids selected from the group consisting of pregnenes, pregnanes, and allopregnanes, which comprises subjecting a 17-desoxy steroid selected from the group consisting of pregnenes, pregnanes, and allopregnanes to the action of an oxygenating enzyme produced by an oxygenating strain of the genus Sporormia.

2. A process for the production of oxygenated steroids selected from the group consisting of pregnenes, pregnanes, and allopregnanes, which comprises subjecting a 17-desoxy steroid selected from the group consisting of pregnenes, pregnanes and allopregnanes under aerobic conditions to the action of an oxygenating enzyme produced by an oxygenating strain of a microorganism of the species *Sporormia minima* to produce the corresponding 17α-hydroxy steroid.

3. The process of claim 2 wherein the 17-desoxy steroid is 4-pregnene-3,20-dione.

4. The process of claim 2 wherein the 17-desoxy steroid is 4-pregnene-11β-ol-3,20-dione.

5. The process of claim 2 wherein the 17-desoxy steroid is 4-pregnene-21-ol-3,20-dione.

6. The process of claim 2 wherein the 17-desoxy steroid is 4-pregnene-11,21-diol-3,20-dione.

7. A process which comprises growing an oxygenating strain of a microorganism of the species *Sporormia minima* under aerobic conditions in a nutrient medium containing assimilable sources of carbon and nitrogen in intimate contact with a 17-desoxy steroid selected from the group consisting of pregnanes, allopregnanes and pregnenes to produce the corresponding 17α-hydroxy steroids.

8. A process which comprises growing an oxygenating strain of a microorganism of the species *Sporormia minima* (NRRL–2475) in an aqueous nutrient medium containing sources of assimilable carbon and nitrogen under aerobic submerged conditions in intimate contact with a 17-desoxy steroid selected from the group consisting of pregnanes, pregnenes and allo-pregnanes to produce the corresponding 17α-hydroxy steroid.

9. A process which comprises growing an oxygenating strain of a microorganism of the species *Sporormia minima* under aerobic conditions in an aqueous medium comprising assimilable sources of carbon and nitrogen and a 17-desoxy steroid selected from the group consisting of pregnenes, pregnanes and allogpregnanes and isolating a 17α-hydroxy steroid from the resulting fermentation broth.

10. A process which comprises growing an oxygenating strain of a microorganism of the species *Sporormia minima* (NRRL–2475) under aerobic conditions in an aqueous nutrient medium comprising dextrose, lactalbumin digest and corn steep liquor in intimate contact with a 17-desoxy steroid selected from the group consisting of pregnenes, pregnanes and allopregnanes to produce the corresponding 17α-hydroxy steroid.

11. A process which comprises subjecting a 17-desoxy steroid selected from the group consisting of pregnenes, pregnanes and allopregnanes under aerobic conditions to the action of an oxygenation enzyme produced by an oxygenating strain of the species *Sporormia minima*.

12. A process which comprises subjecting a 17-desoxy steroid selected from the group consisting of pregnenes, pregnanes and allopregnanes under aerobic conditions to the action of oxygenation strain of *Sporormia minima* (NRRL–2475) and isolating a 17α-hydroxy steriod thus produced from the resulting fermentation broth.

References Cited in the file of this patent
UNITED STATES PATENTS 2,264,861    Schoeller _____ Dec. 2, 1941

OTHER REFERENCES

Fried et al.: J. A. C. S., 75, Nov. 20, 1953, pages 5764, 5765.

Meystre et al.: Helvetica Chimica Acta, 37, 1954, pages 1548–1553.